United States Patent
Nakayama et al.

(10) Patent No.: US 8,129,617 B2
(45) Date of Patent: Mar. 6, 2012

(54) ELECTRIC DISTRIBUTION BOX

(75) Inventors: Makoto Nakayama, Kakegawa (JP); Shinichi Hamaguchi, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 508 days.

(21) Appl. No.: 12/362,047

(22) Filed: Jan. 29, 2009

(65) Prior Publication Data
US 2009/0194324 A1 Aug. 6, 2009

(30) Foreign Application Priority Data
Jan. 31, 2008 (JP) ................................ 2008-020935

(51) Int. Cl.
*H05K 5/00* (2006.01)
(52) U.S. Cl. ............ 174/50; 174/520; 174/60; 174/559; 361/600; 439/535
(58) Field of Classification Search ............... 174/50, 174/60, 63, 64, 520; 220/4.02; 248/906; 439/535; 361/600
See application file for complete search history.

(56) References Cited

U.S. PATENT DOCUMENTS

| 7,479,598 B1 * | 1/2009 | Shotey et al. | 174/58 |
| 7,923,634 B2 * | 4/2011 | Yokawa | 174/50 |
| 7,947,902 B2 * | 5/2011 | Tang | 174/50 |

FOREIGN PATENT DOCUMENTS

JP 10-322854 A 12/1998

* cited by examiner

*Primary Examiner* — Dhirubhai R Patel
(74) *Attorney, Agent, or Firm* — Sughrue Mion, PLLC

(57) ABSTRACT

An electric distribution box includes a resin exterior cover which houses an interior component and has an opening for resin-molding the exterior cover on a bottom wall of the exterior cover, and a resin cap which is fit into the opening to close the opening. A flange formed on an outer periphery of the resin cap is kept in intimate contact with the bottom wall of the exterior cover. A molding hole for forming a locking piece by resin molding is provided on the flange. The locking piece locks the resin cap to the opening of the exterior cover. A swell is formed at an entire peripheral edge of the molding hole of the resin cap. An outer face of the interior component is kept in intimate contact with the swell so that the molding hole of the resin cap is closed by the outer face of the interior component and the flange is kept in intimate contact with the bottom wall of the exterior cover.

4 Claims, 7 Drawing Sheets

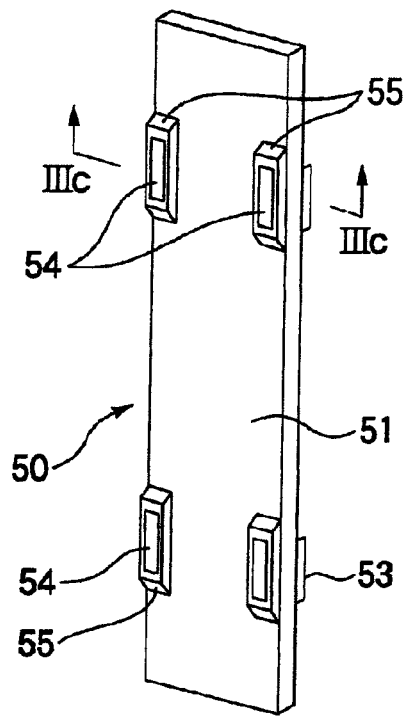
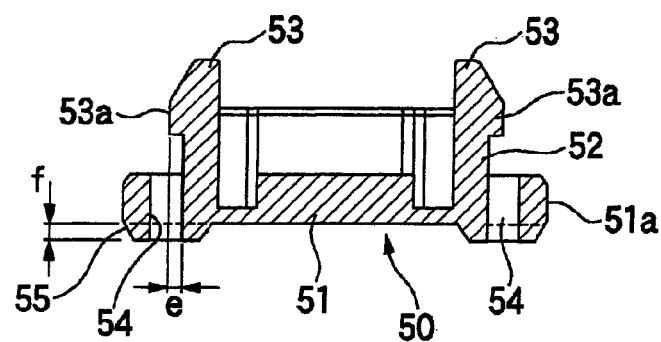
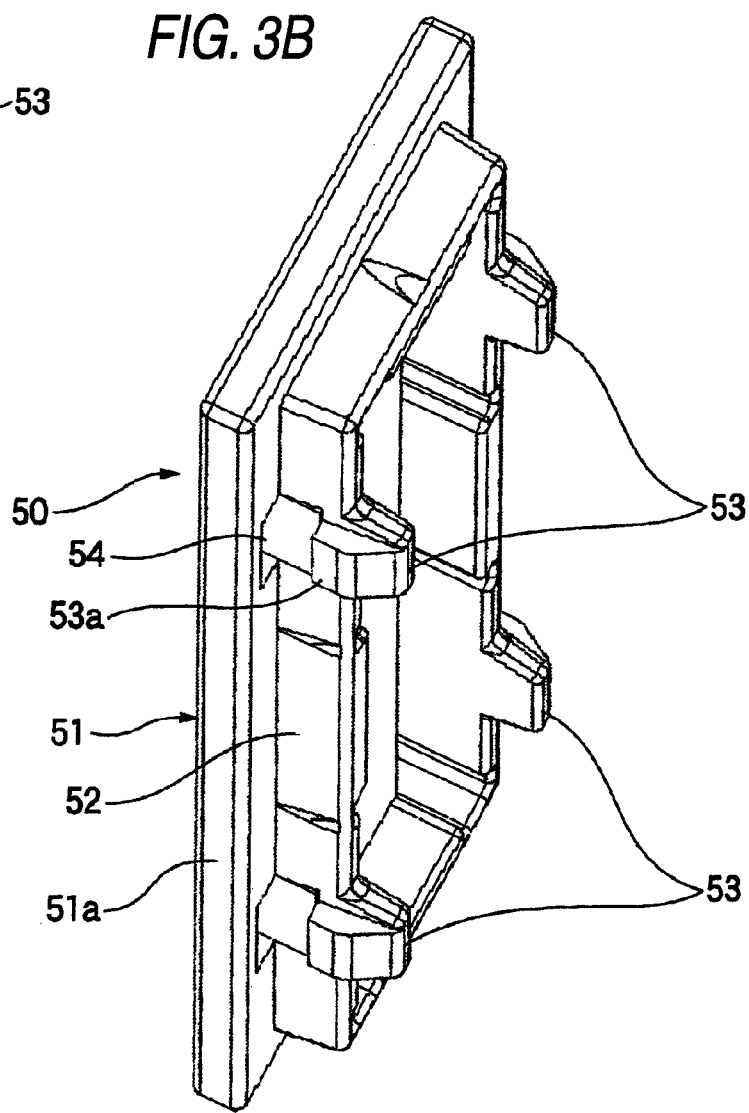
FIG. 3A
FIG. 3C
FIG. 3B

ELECTRIC DISTRIBUTION BOX

BACKGROUND

This invention relates to an electric distribution box such as a relay box, a fuse box or an electric control unit box which is mounted in a vehicle such as a automobile and incorporates an electric component such as a relay, a fuse or an electric control unit, and more particularly to an electric distribution box having an exterior cover of resin for incorporating the interior component and a molding hole (shape-punching hole) from which water may externally invade formed on the bottom wall of the exterior cover.

For convenience of molding, resin molded products may generate a molding hole for removing a metallic mold (e.g. see Patent Reference 1).

Where such a molding hole exists on the exterior cover of the electric distribution box requiring waterproof capability, rain water may invade from the molding hole. So, usually, the molding hole is covered with a cap. However, the cap itself may have a small molding hole for forming a locking piece. In such a case, in order to prevent water from invading from the molding hole, this molding hole is arranged on a flange being in intimate contact with the wall of the cover. However, it has been found that because of a clearance necessary in locking, a gap may be generated between the flange and the cover, and water may invade through the gap.

SUMMARY

This invention has been accomplished in view of the above circumstances. An object of this invention is to provide an electric distribution box which can easily prevent water invasion without using a redundant component thereby to improve waterproof capability even where a cap itself fit in order to close the opening of an exterior cover (large molding hole) has a molding hole.

In order to attain the above object, the electric distribution box according to this invention has features identified in the following items (1) to (4).

(1) There is provided an electric distribution box, comprising:
a resin exterior cover which houses an interior component,
wherein a molding hole is provided on a bottom wall of the resin exterior cover;
wherein a swell is formed at an entire peripheral edge of the molding hole; and
wherein an outer face of the interior component is kept in intimate contact with the swell so that the molding hole is closed by the outer face of the interior component.

(2) There is provided an electric distribution box, comprising:
a resin exterior cover which houses an interior component, and has an opening for resin-molding the exterior cover on a bottom wall of the exterior cover; and
a resin cap which is fit into the opening to close the opening,
wherein a flange formed on an outer periphery of the resin cap is kept in intimate contact with the bottom wall of the exterior cover;
wherein a molding hole for forming a locking piece by resin molding is provided on the flange;
wherein the locking piece locks the resin cap to the opening of the exterior cover;
wherein a swell is formed at an entire peripheral edge of the molding hole of the resin cap; and
wherein an outer face of the interior component is kept in intimate contact with the swell so that the molding hole of the resin cap is closed by the outer face of the interior component and the flange is kept in intimate contact with the bottom wall of the exterior cover.

(3) Preferably, a recessed portion is formed on the bottom wall of the exterior cover. The opening of the exterior cover is formed on a bottom of the recessed portion. The height of the swell is set at a height protruding from the recessed portion. The outer face of the interior component is abut against the bottom wall of the exterior cover so that the outer face of the interior component is kept in contact with the swell protruding from the recessed portion, the molding hole of the cap is closed by the outer face of the interior component, and the flange is kept in contact with the bottom of the recessed portion.

(4) Preferably, a plurality of the openings are arranged on the exterior cover in a scattering manner. A plurality of the caps are fit into the openings respectively. The outer face of the interior component is kept in intimate contact with the swells of the caps.

In accordance with the electric distribution box having the configuration of the above item (1), a swell is formed at the entire peripheral edge of the molding hole existing on the bottom wall of the exterior cover and the bottom of the interior component is kept in intimate contact with the swell so that the molding hole is closed by the bottom of the interior component. For this reason, without any specific means, water invasion from the molding hole can be prevented.

In accordance with the electric distribution box having the configuration of the above item (2), a swell is formed at the entire peripheral edge of the molding hole made on a cap and the outer face of the interior component is kept in intimate contact with the swells so that the molding hole is closed by the outer face of the interior component. For this reason, without any specific means, water invasion from the molding hole can be prevented. Further, since the flange of the cap is kept in intimate contact with the inner face of the bottom wall of the exterior cover, any gap can be prevented from being generated between the contact faces of the flange and cover, thereby preventing water invasion form the gap.

Further, by the reactive force generated when the interior component is brought into intimate contact with the swells, the interior component can be supported. For this reason, rattling of the interior component can be prevented. In this case, rattling of the interior component can be adjusted by only adjusting the height of the swells so that rattling of the interior component can be prevented by only adjusting the metallic mold of the cap. Further, the rattling can be prevented by only replacing the cap according to generation of rattling so that maintenance can be easily done.

In accordance with the electric distribution box having the configuration identified in the above item (3), a recessed portion is formed on the bottom wall of the exterior cover; the opening is formed on the bottom of the recessed portion; the bottom of the interior component is caused to abut on the inner face of the bottom wall of the exterior cover so that the bottom of the interior component is kept in contact with the swells protruding from the recessed portion so that the molding hole is closed by the bottom of the interior component; and the flange is kept in contact with the bottom of the recessed portion. For this reason, the molding hole of the cap can be closed while elastically deforming the swell accurately by the extent of the height protruding from the recessed portion. Further, by the repulsive force generated in the cap due to the elastic deformation of the swell, the flange can be brought into intimate contact with the bottom of the recessed portion. In this case, the crushing allowance of the cap can be constantly managed so that the quality can be constantly managed.

In accordance with the electric distribution box having the configuration identified in the above item (4), the interior component can be supported by the plurality of caps appropriately scattered.

In accordance with this invention, a swell is formed at the entire peripheral edge of the molding hole and the bottom of the interior component is kept in intimate contact with the swell so that the molding hole is closed by the bottom of the interior component. For this reason, without any specific means, water invasion from the molding hole can be prevented, thereby enhancing the waterproof capability of the electric distribution box.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 3A to 3C are views showing the structure of the cap; FIG. 3A is a perspective view seen from the front, FIG. 3B is a perspective view seen from the rear, and FIG. 3C is a sectional view seen along an arrow of IIIc-IIIc in FIG. 3A;

FIG. 7A is a perspective view showing the relationship between the cap and the opening of the exterior cover, and FIG. 7B is a sectional view showing the state where the cap is mounted in the opening.

DETAILED DESCRIPTION OF EXEMPLARY EMBODIMENTS

Figure 1:
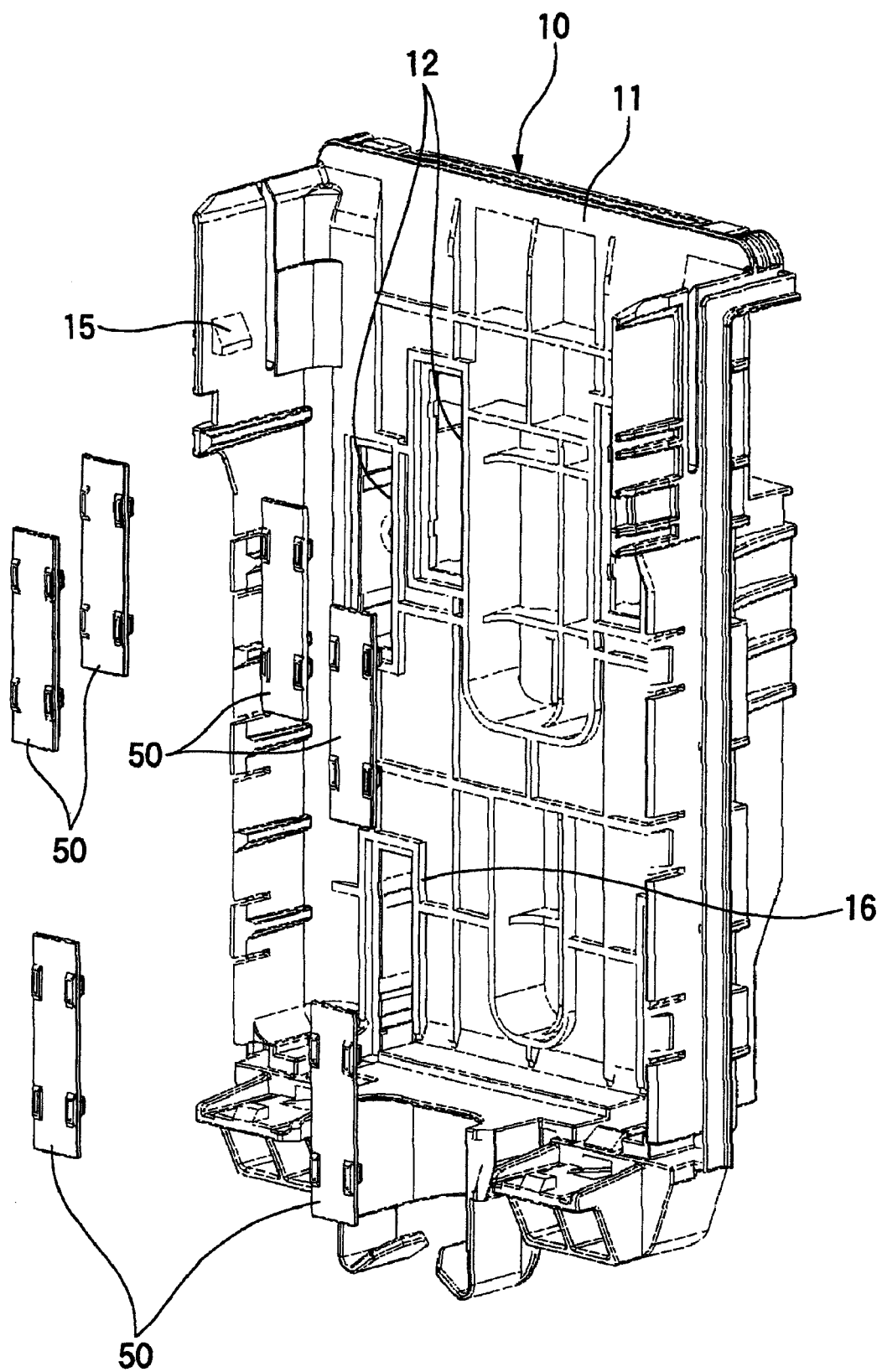
FIG. 1 is an exploded perspective view of an exterior cover and cap in an electric distribution box in an embodiment according to this invention.

Hitherto, this invention has been explained briefly. Referring to the attached drawings, by reading through the best mode for carrying out the invention explained below, the details of this invention will be further clarified.

Hereinafter, referring to the drawings, a detailed explanation will be given of a preferred embodiment of this invention.

Figure 2:
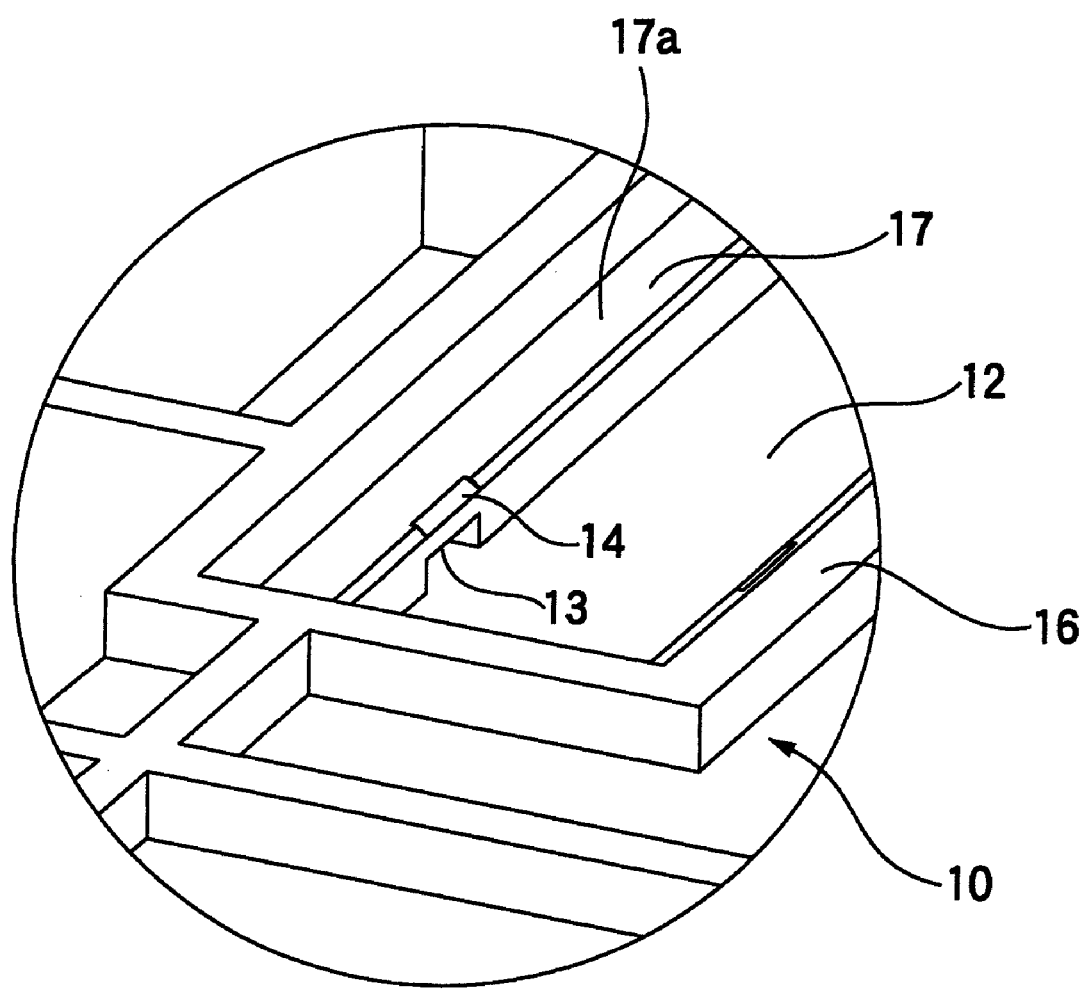
FIG. 2 is a perspective view of a part of an opening of an exterior cover on which a cap is mounted.
Figure 4:
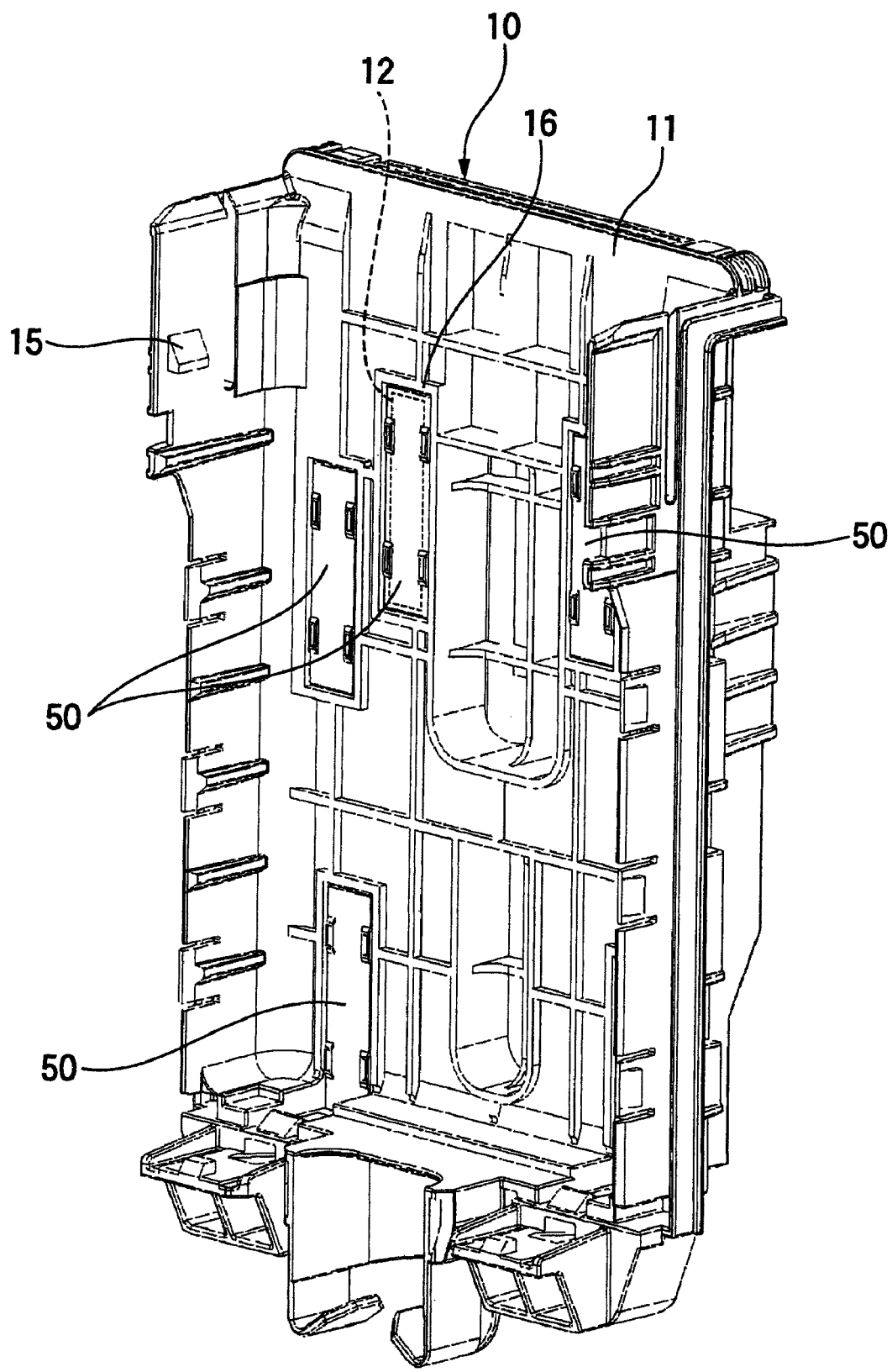
FIG. 4 is a perspective view of the state where the opening of an exterior cover is closed by a cap.
Figure 5:
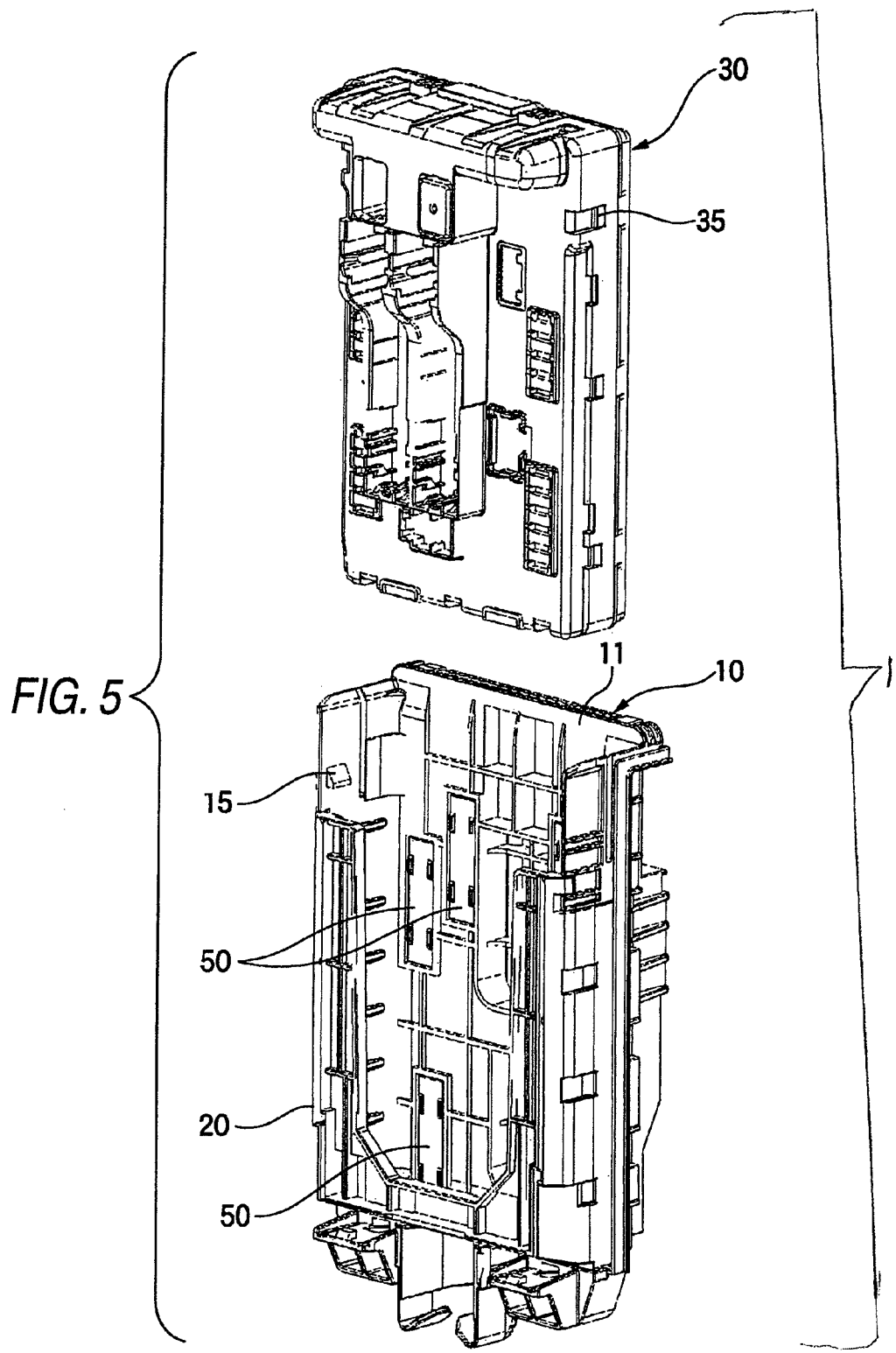
FIG. 5 is a perspective view showing the state where an interior component is about to be mounted in the exterior cover in the state of FIG. 4.
Figure 6:
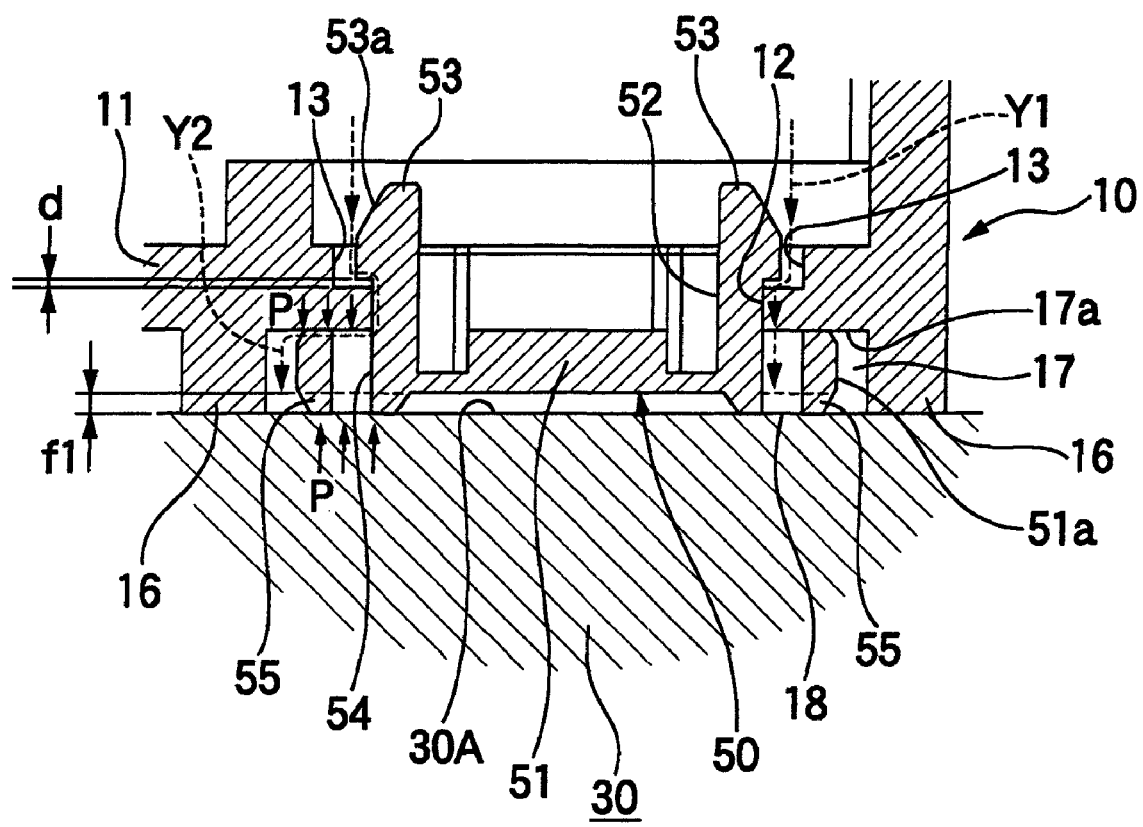
FIG. 6 is a sectional view of a cap mounting portion in the state where the interior component has been mounted.
Figure 7A:
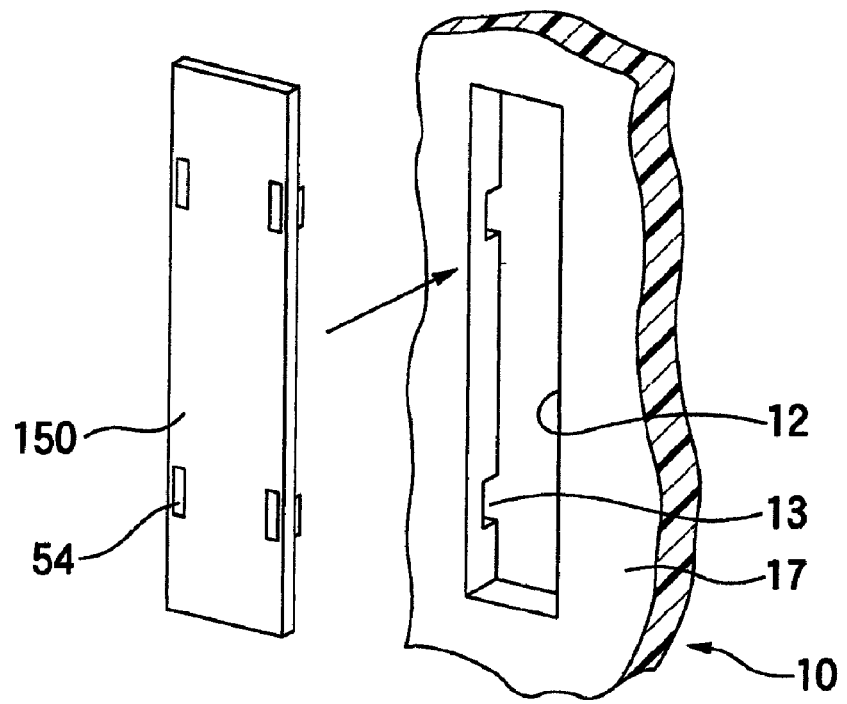
FIGS. 7A and 7B are views showing a portion of an electric distribution box according a comparative example which is a premise of this invention.
Figure 7B:
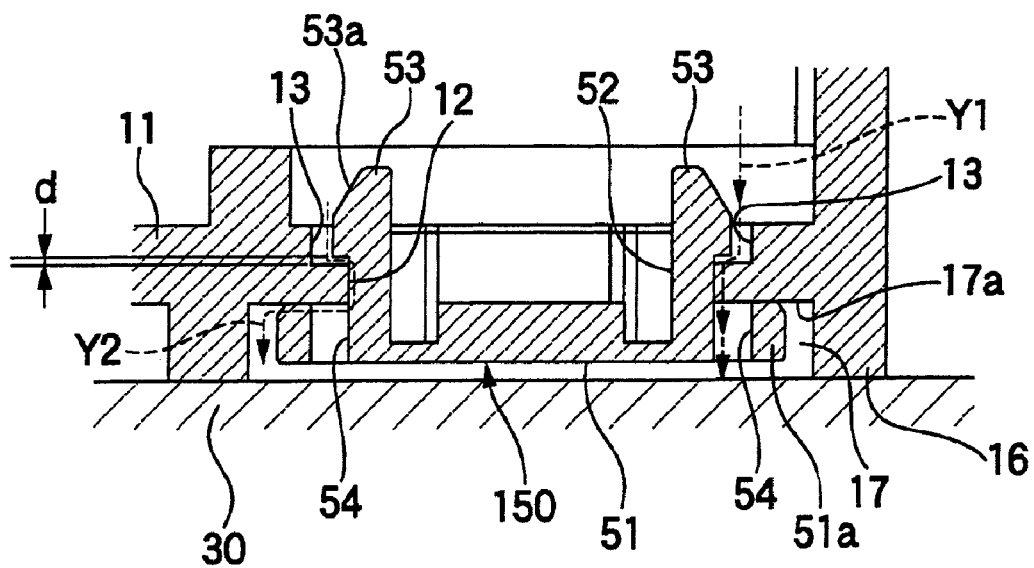

FIG. 1 is an exploded perspective view of an exterior cover and cap in an electric distribution box in an embodiment according to this invention. FIG. 2 is a perspective view of a part of an opening of an exterior cover on which a cap is mounted. FIG. 3A to FIG. 3C are views showing the structure of the cap; FIG. 3A is a perspective view seen from the front, FIG. 3B is a perspective view seen from the rear, and FIG. 3C is a sectional view seen along an arrow of IIIc-IIIc in FIG. 3A. FIG. 4 is a perspective view of the state where the opening of an exterior cover is closed by a cap. FIG. 5 is a perspective view showing the state where an interior component is about to be mounted in the exterior cover in the state of FIG. 4. FIG. 6 is a sectional view of a cap mounting portion in the state where the interior component has been mounted. FIGS. 7A and 7B are views showing a portion of an electric distribution box according to a comparative example which is a premise of this invention; FIG. 7A is a perspective view showing the relationship between the cap and the opening of the exterior cover, and FIG. 7B is a sectional view showing the state where the cap is mounted in the opening.

The electric distribution box according to the embodiment includes an exterior cover 10 made of synthetic resin (e.g. PPE) shown in FIG. 1, an auxiliary cover 20 shown in FIG. 5 and an electric distribution box body which is an interior component 30. The exterior cover 10 is constructed of a lower cover incorporating the interior component 30; as shown in FIG. 1, on the bottom wall 11 thereof, a plurality of square openings 12 (six in the illustrated example) in resin-molding the exterior cover 10 are arranged in a scattering manner.

In this case, on the inner face of the bottom wall 11 of the exterior cover 10, as shown in FIG. 6, a rib 16 on which the bottom face of the interior component 30 abuts is protruded. As shown in FIG. 2, on the bottom face 17a of an internal recessed portion 17 encircled by the rib 16, an opening 12 is formed. Further, as shown in FIG. 5, in order to lock the interior component 30 incorporated, in the exterior cover 10, a locking piece 15 is formed to be engaged with a locking piece 35 on the interior component 30 side.

Further, in order to close each opening 12, as shown in FIG. 4, a cap 50 is fit over each opening 12 from inside of the exterior cover 10 and locked.

The cap 50, as shown in FIGS. 3A to 3C, includes a rectangular face plate 51 larger than the square opening 12 of the exterior cover 10, a square frame-like peripheral side wall 52 which is protruded on the rear side of the face plate 51 and fit in the inner periphery of the opening 12 and four locking pieces 53 protruded on the opposite longer sides of the peripheral side wall 52.

The face plate 51 has a flange 51a in intimate contact with the bottom 17a of the recessed portion 17 of the exterior cover 10 at its entire peripheral edge, from which the peripheral side wall 52 internally protrudes. At the outer tip of each locking piece 53, an engagement projection 53a is formed. In order to form the engagement projection 53a, a molding hole 54 is formed in the flange 51a. Namely, as shown in FIG. 3C, in order to assure the quantity of outward projection e of the engagement projection 53a, the molding hole 54 is formed in the flange 51a of the face plate 51.

On the other hand, as shown in FIG. 2, on the rear side of the peripheral edge of the opening 12 of the exterior cover 10, an engagement recessed portion 13 with which the engagement projection 53a of each locking piece 53 is engaged is formed. In order that the engagement projection 53a easily enters the engagement recessed portion 13, a chamfering 14 is formed on the front side of the periphery of the opening 12.

Further, on the peripheral edge on the front side of each molding hole 54 of the cap 50, a continuous swell 55 is formed at the entire peripheral edge of the molding hole 54. The swell 55 is formed at a height f projecting from the recessed portion 17 (i.e. from the upper end of the rib 16) in the state where the cap 50 is fit over the opening 12 formed on the bottom 17a of the recessed portion 17.

In the state where the cap 50 is fit over each opening 12 so that the engagement projection 53a of the locking piece 53 is engaged to the engagement recessed portion 13 on the exterior cover 10 side (see FIG. 4), as shown in FIG. 5, the interior component 30 is internally housed in the exterior cover 10. Thus, as shown in FIG. 6, the bottom (outer face 30A) of the interior component 30 abuts on the rib 16 of the exterior cover 10; and in this sate, the bottom of the interior component 30 is in intimate contact with the swell 55 of the cap 50 projecting from the recessed portion 17 and the bottom of the interior component 30 closes the molding hole 54 of the cap 50. In addition, the flange 51a of the cap 50 is in intimate contact with the bottom 17a of the recessed portion 17. Namely, pressing force P is applied to the swell 55 from the bottom of the interior component 30 so that the pressing force P acts between the flange 51a and the bottom 17a of the recessed portion 17.

Accordingly, since the molding hole 54 is closed by the bottom of the interior component 30, invasion of water from the molding hole 54 of the cap 50 (invasion of water along the path indicated by a dotted line Y1) can be prevented. Further, since the flange 51a of the cap 50 is in intimate contact with the bottom 17a of the recessed portion 17, no gap is formed between the contact faces of the flange 51a and the exterior cover 10, invasion of water through the gap (invasion of water along the path indicated by a dotted line Y2) can be prevented.

Further, a clearance d necessary for locking exists between the engagement faces of the engagement projection 53a of the locking piece 53 and engagement recessed portion 13 of the exterior cover 10. For this reason, like a comparative example described later, where the pressing force from the interior component 30 does not act on the cap 50, the gap corresponding to the clearance d may be made between the flange 51a and the bottom 17a of the recessed portion 17. On the other hand, in this embodiment, the flange 51a is in intimate contact with the bottom 17a of the recessed portion 17 so that no gap is opened therebetween. Thus, regardless of the magnitude of the clearance d for locking, invasion of water can be prevented.

Further, in this electric distribution box, by the reactive force generated when the interior component 30 is brought into intimate contact with the swells 55 of the cap 50, the interior component 30 can be inversely supported. For this reason, rattling of the interior component 30 can be prevented. Particularly, since the interior component 30 is supported by the plurality of caps 50 scattered, it can be supported stably.

In this case, rattling of the interior component 30 can be adjusted by only adjusting the height of the swells 55 so that rattling of the interior component 30 can be prevented by only adjusting the metallic mold of the cap 50. Further, the rattling can be prevented by only replacing the cap 50 according to generation of rattling so that maintenance can be easily done.

Further, in this embodiment, the rib 16 encircling the molding hole 54 is protruded on the inner face of the bottom wall 11 of the exterior cover 10 and the bottom of the interior component 30 is caused to abut on the upper face of the rib 16. Thus, the molding holes 54 can be closed while elastically deforming the swells 55 by the extent of the height protruding from the recessed portion 17 inside the rib 16. Further, by the repulsive force generated in the cap 50 due to the elastic deformation of the swells 55, the flange 51a of the cap 50 can be brought into intimate contact with the bottom 17a of the recessed portion 17. In this way, the crushing allowance of the cap 50 can be constantly managed so that the quality regarding the waterproof capability of all the caps 50 can be constantly managed.

Now, an explanation will be given of a comparative example shown in FIGS. 7A and 7B.

In this comparative example, a cap 150 is not provided with the swells 55 described above. Except for this, the cap 150 has the same structure as the cap 50 described above. In the cap 150, like reference numerals refers to like elements in the cap 50.

In this comparative example, the pressing force from the interior component 30 does not act on the cap 150 so that a gap is likely to be opened between the mating faces of the flange 51a of the cap 150 and the bottom 17a of the recessed portion 17. Particularly, a clearance d necessary for locking exists between the engagement faces of the engagement projection 53a of the locking piece 53 and engagement recessed portion 13 of the exterior cover 10. For this reason, where the pressing force from the interior component 30 does not act on the cap 150, owing to e.g. vibration of a vehicle, the gap corresponding to the clearance d is likely to be opened between the flange 51a and the bottom 17a of the recessed portion 17 which are in intimate contact with each other. If the gap is opened, there occurs some possibility of water invasion from the gap along the path indicated by a dotted arrow Y2. There is also strong possibility of invasion from the molding hole 54 along dotted allow Y1 of the water conveyed from the gap between the cap 150 and the opening 12.

In connection with this matter, as described above, in accordance with the electric distribution box according to the embodiment of this invention, any problem presented by the comparative example shown in FIGS. 7A and 7B can be solved so that only addition of a simple structure can highly enhance the waterproof capability.

Additionally, this invention should not be limited to the embodiment described above, but can be appropriately modified or improved. Further, the material, shape, size, number and location of each component in this embodiment described above should not be limited as long as this invention can be accomplished.

For example, in the embodiment described above, it was proposed that in order to close the molding holes 54 formed in the cap 50, the swells 55 are formed in the cap 50 so that the interior component 30 is kept in intimate contact with the swells 55. However, where the opening 12 on the bottom wall 11 of the exterior cover 10 is small, without using the cap, the swell may be directly formed on the periphery of the opening 12 and the bottom of the interior component may be brought into intimate contact with the swell, thereby permitting the opening to be closed.

The present application is based on Japan Patent Application No. 2008-020935 filed on Jan. 31, 2008, the contents of which are incorporated herein for reference.

What is claimed is:

1. An electric distribution box, comprising:
   a resin exterior cover which houses an interior component and a cap for covering an opening in the resin exterior cover,
   wherein a molding hole is provided on a peripheral portion of the cap;
   wherein a swell is formed at an entire peripheral edge of the molding hole; and
   wherein an outer face of the interior component is kept in intimate contact with the swell so that the molding hole is closed by the outer face of the interior component.

2. An electric distribution box, comprising:
   a resin exterior cover which houses an interior component, and has an opening therein; and
   a resin cap which is fit into the opening to close the opening,
   wherein a flange formed on an outer periphery of the resin cap is kept in intimate contact with a bottom wall of the exterior cover;
   wherein a molding hole for forming a locking piece by resin molding is provided on the flange;
   wherein the locking piece locks the resin cap to the opening of the exterior cover;

wherein a swell is formed at an entire peripheral edge of the molding hole of the resin cap; and wherein an outer face of the interior component is kept in intimate contact with the swell so that the molding hole of the resin cap is closed by the outer face of the interior component and the flange is kept in intimate contact with the bottom wall of the exterior cover.

3. The electric distribution box according to claim 2, wherein a recessed portion is formed on the bottom wall of the exterior cover;

wherein the opening of the exterior cover is formed on a bottom of the recessed portion;

wherein a height of the swell is set at a height protruding from the recessed portion; and wherein the outer face of the interior component is abut against the bottom wall of the exterior cover so that the outer face of the interior component is kept in contact with the swell protruding from the recessed portion, the molding hole of the resin cap is closed by the outer face of the interior component, and the flange is kept in contact with the bottom of the recessed portion.

4. The electric distribution box according to claim 2, wherein the resin exterior cover includes a plurality of openings arranged on the exterior cover in a scattered manner;

wherein a plurality of caps are fit into the openings respectively; and wherein the outer face of the interior component is kept in intimate contact with the swells of the caps.

* * * * *